United States Patent [19]
Pepperman et al.

[11] Patent Number: 5,358,379
[45] Date of Patent: Oct. 25, 1994

[54] GAS TURBINE VANE

[75] Inventors: Barton M. Pepperman, Orlando; Andrew J. Ayoob, Oviedo, both of Fla.

[73] Assignee: Westinghouse Electric Corporation, Pittsburgh, Pa.

[21] Appl. No.: 141,756

[22] Filed: Oct. 27, 1993

[51] Int. Cl.$^5$ .............................................. F04D 29/44
[52] U.S. Cl. .................. 415/191; 415/208.1; 416/224
[58] Field of Search ............. 415/191, 208.1; 416/224, 223 A

[56] References Cited

U.S. PATENT DOCUMENTS

| | | | |
|---|---|---|---|
| 3,215,511 | 11/1965 | Chisholm et al. | 416/224 |
| 3,315,941 | 4/1967 | Davies | 415/208.2 |
| 3,430,898 | 3/1969 | Parechanian et al. | 416/224 |
| 3,487,805 | 1/1970 | Satterthwaite et al. | 115/42 |
| 3,650,635 | 3/1972 | Wachtell | 415/208.1 |
| 3,856,434 | 12/1974 | Hoffman | 416/224 |
| 4,305,697 | 12/1981 | Cohen | 415/208.1 |
| 4,326,833 | 4/1982 | Zelahy | 416/224 |
| 5,044,884 | 9/1991 | Thibault et al. | 416/189 |

FOREIGN PATENT DOCUMENTS 215905  12/1984  Japan ........................ 416/224

*Primary Examiner*—John T. Kwon
*Attorney, Agent, or Firm*—G. R. Jarosik

[57] ABSTRACT

A vane for the turbine section of a gas turbine has an airfoil portion with leading edge, center and trailing edge portions. The leading edge portion is attached to the center portion by a dove tail joint that allows the leading edge portion to slide in the radial direction with respect to the center portion while preventing movement in the axial and circumferential directions, thereby eliminating thermal stresses created by differential thermal expansion between the leading edge portion and the remainder of the vane. An opening in the vane inner shroud that is normally sealed by a closure plate allows the leading edge portion to be readily replaced in the event of damage. The leading edge portion may be formed from a ceramic material and need not be supplied with cooling air.

17 Claims, 3 Drawing Sheets

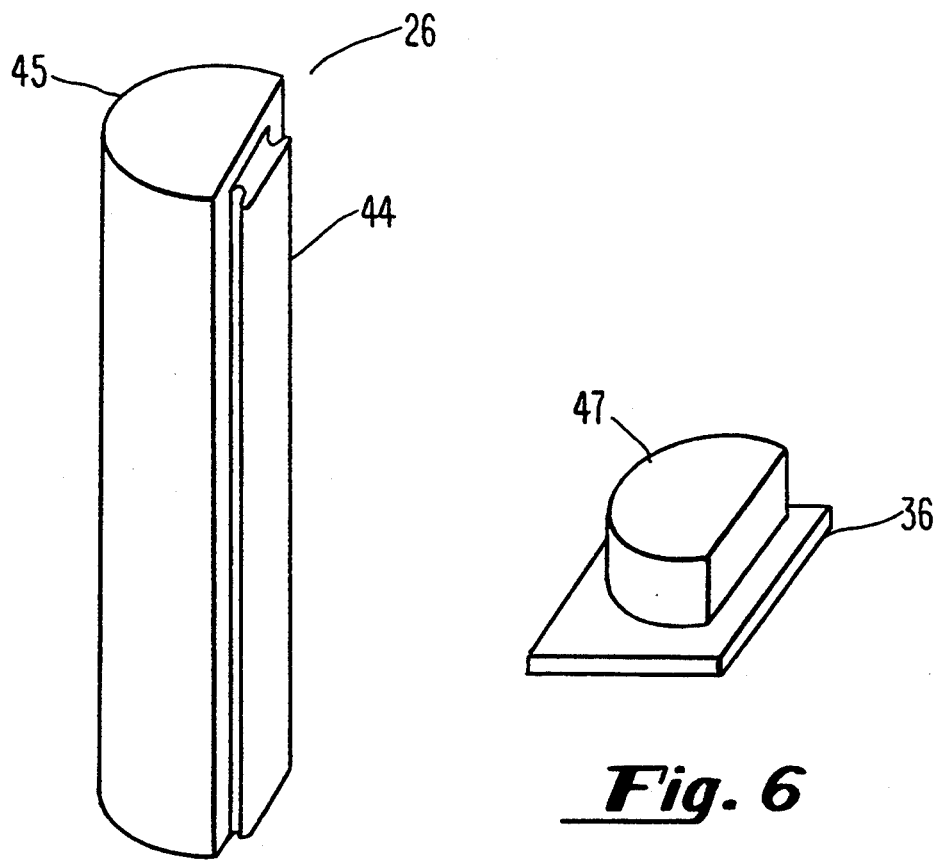
Fig. 5
Fig. 6
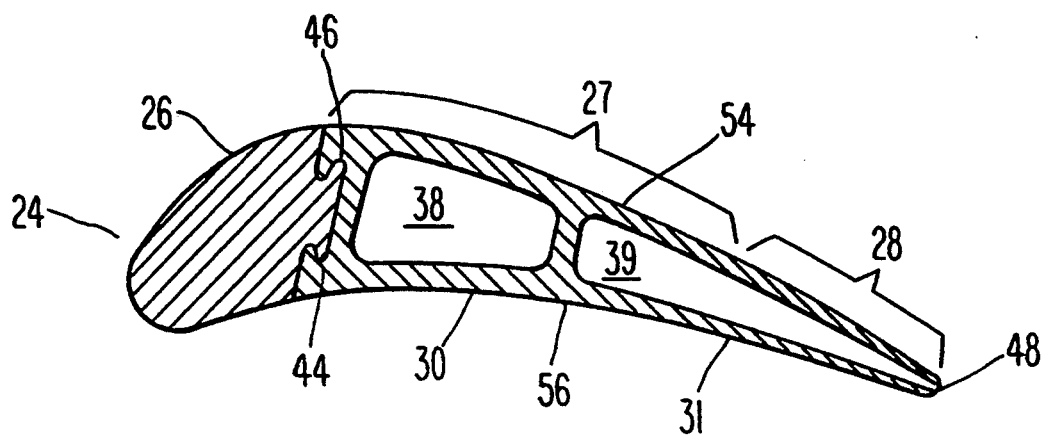
Fig. 7

1

GAS TURBINE VANE

BACKGROUND OF THE INVENTION

The present invention relates to an airfoil for use in a turbo-machine. More specifically, the present invention relates to an airfoil for use in a stationary vane in the turbine section of a gas turbine.

A gas turbine employs a plurality of stationary vanes that are circumferentially arranged in rows in the turbine section of the gas turbine. Such turbine vanes are exposed to the hot, sometimes corrosive and particle laden, gas discharging from the combustion section. This exposure creates a variety of problems in the vanes, including corrosion, erosion, and cracking due to over-temperature and thermal stress. Such problems can reduce the useful life of the vane, thereby increasing the operating cost and reducing the availability of the gas turbine.

The corrosion, erosion and cracking problems are often most severe at the leading edge portion of the vane airfoil because the hot gas flows directly into the leading edge and creates high heat transfer coefficients. Unfortunately, since vane airfoils have generally employed an integral, cast construction, repair of the leading edge portion required a difficult and expensive welding operation.

One approach to improving vane life that has been attempted in the past is to form cooling air passages in the leading edge portion of the airfoil so as to reduce its temperature. Unfortunately, the use of such cooling air, which bypasses the combustion section, detracts from the thermodynamic performance of the turbine. Another approach used in the past involves forming the vanes from ceramic materials, which have excellent high temperature strength, as well as corrosion and erosion resistance. Unfortunately, such ceramic materials are brittle and unable to withstand the high thermal stresses imposed by the differential thermal expansion that occurs among the various portions of the vane, especially during start-up and shutdown.

It is therefore desirable to provide a gas turbine vane having a leading edge portion that can be readily repaired and that can be made from a ceramic material without imposing high stresses due to differential thermal expansion.

SUMMARY OF THE INVENTION

Accordingly, it is the general object of the current invention to provide a gas turbine vane having a leading edge portion that can be readily repaired and that can be made from a ceramic material without imposing high stresses due to differential thermal expansion.

Briefly, this object, as well as other objects of the current invention, is accomplished in a gas turbine comprising a turbine section having a rotating shaft disposed therein to which a row of rotating blades are attached and around which a row of stationary vanes are circumferentially arranged. Each of the vanes have an airfoil portion that has (i) a leading edge portion, (ii) a trailing edge portion, (iii) a center portion disposed between the leading edge portion and the trailing edge portion, and (iv) means for slidably securing the leading edge portion to the center portion. In one embodiment, the slidable securing means comprises first and second interlocking members protruding from the leading edge and center portions, respectively, for allowing the leading edge portion to slidably move in a radial direction with respect to the center portion. In a preferred embodiment, the first member has an approximately T-shaped cross-section and the second member forms a groove with which the first member mates.

BRIEF DESCRIPTION OF THE DRAWINGS

FIG. 5 is an isometric view of the leading edge portion of the vane shown in FIG. 2.

FIG. 6 is an isometric view of the leading edge portion closure plate shown in FIGS. 3 and 4.

FIG. 7 is a cross-section through lines VII—VII shown in FIG. 4.

DESCRIPTION OF THE PREFERRED EMBODIMENT

Figure 1:
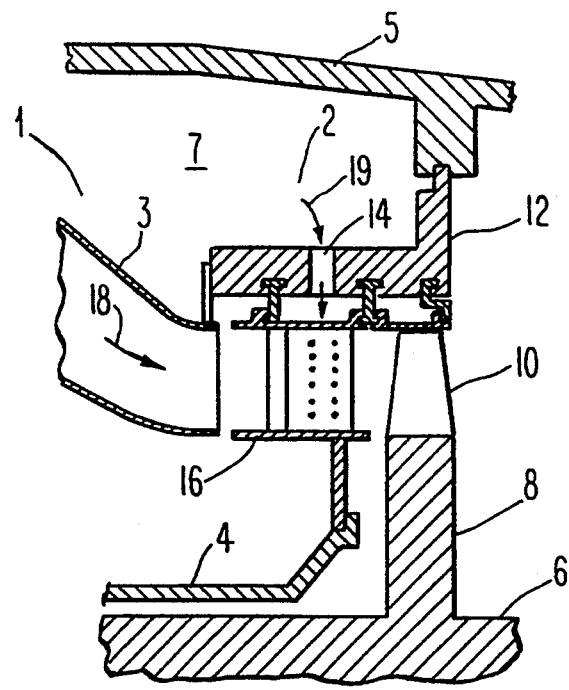
FIG. 1 is a longitudinal cross-section through a portion of the combustion and turbine sections of a gas turbine employing a stationary vane of the current invention.

Referring to the drawings, there is shown in FIG. 1 the combustion section 1 of a gas turbine. A typical gas turbine is shown in U.S. Pat. No. 4,991,391 (Kosinski), hereby incorporated by reference in its entirety. The combustion section 1 is comprised of inner and outer shells 4 and 5, respectively, that form an annular chamber 7 therebetween. The inner shell 4 encloses a centrally disposed rotor 6. The combustion section 1 also includes a plurality of ducts 3 that direct hot combustion gas 18, having temperatures in excess of 1200° C. (2200° F.) from the combustors (not shown) to a turbine section 2.

The turbine section 2 includes a blade ring 12 that is supported from the outer shell 5. The blade ring 12 supports a row of stationary vanes 16 so that the vanes are disposed in a circumferential array around the rotor 6. A row of rotating blades 10, attached to a disc 8 portion of the rotor 6, is disposed downstream of the row of vanes 16. Compressed air from the compressor section (not shown) flows through the annular chamber 7. While the majority of the compressed air from the compressor section serves to supply air for combustion in the combustors, a portion of the compressed air forms cooling air 19. The cooling air 19 bypasses the combustors and flows into the vanes 16 through holes 14 in the blade ring 12.

Figure 2:
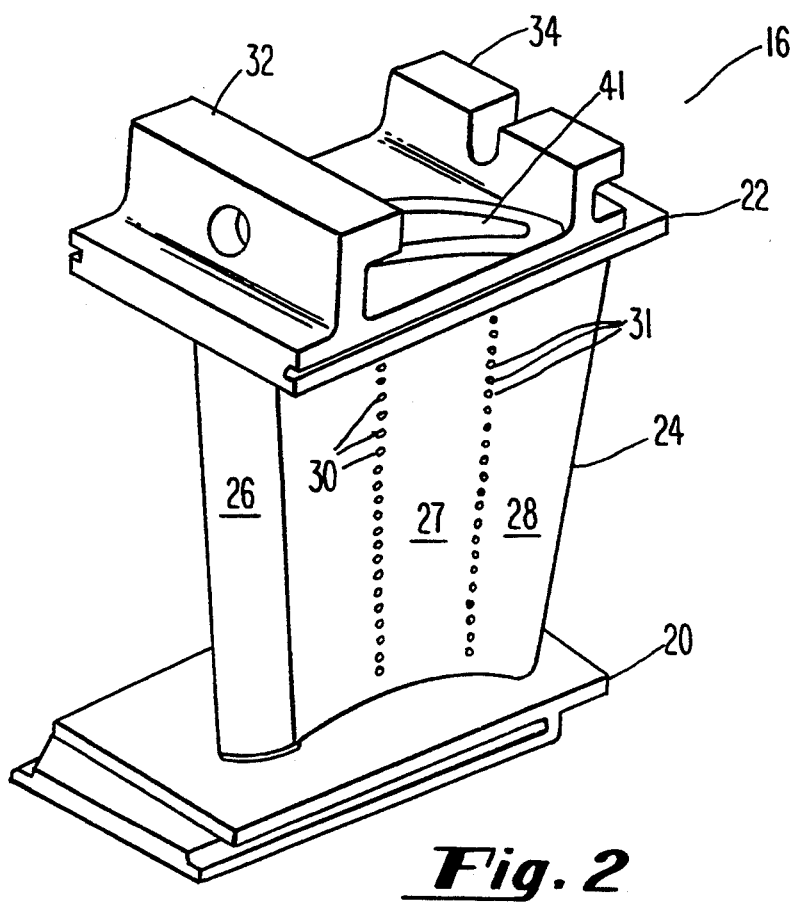
FIG. 2 is an isometric view of the vane shown in FIG. 1.

As shown in FIG. 2, each vane 16 is comprised of an inner shroud 20, an outer shroud 22 and an airfoil 24 disposed between the inner and outer shrouds—i.e., the shrouds are attached to the ends of the airfoil. Lugs 32 and 34 extend from the outer shroud and allow the vane 16 to be affixed to the blade ring 12, as shown in FIG. 1. According to the current invention, each airfoil 24 comprises a detachable upstream leading edge portion 26 that is attached to the body of the airfoil. The airfoil body comprises a downstream trailing edge portion 28 that is integrally formed with a center portion 27 disposed between the leading edge and trailing edge portions.

As shown in FIG. 5, the leading edge portion 26 of the airfoil comprises an elongate member having a rounded, aerodynamically shaped front portion 45. The surfaces of the front portion 45 are shaped so as to be smoothly contiguous with the convex and concave surfaces 54 and 56, respectively, that form the suction and pressure surfaces of the body portion of the airfoil 24, as shown in FIG. 7.

As shown in FIG. 5, a projection 44 extends from the rear face of the leading edge portion 26. In the preferred embodiment, the projection 44 has an approximately T-shaped cross-section. Most preferably, the T-shaped cross-section is formed from angled, rather than straight, sides so as to create what is typically referred to by those skilled in the art as a "dove tail," as shown in FIG. 7. Projections that extend from the front face of the center portion 27 form a correspondingly shaped groove 46 that mates with the leading edge portion projection 44 so that the projection 44 and the groove 46 interlock.

As shown in FIG. 7, when the projection 44 and the groove 46 mate, they form a joint that interlocks in such a way that the leading edge portion 26 is free to move in the radial direction—that is, perpendicular to the center line of the rotor 6—with respect to the center portion 27. However, this projection/groove joint prevents motion of the leading edge portion 26 in the axial and circumferential directions, thereby securely attaching the leading edge portion to the remainder of the vane. This provision for movement of the leading edge portion 26 in the radial direction allows the leading edge portion to slide along the center portion 27, giving rise to two important advantages of the current invention over vanes used in the past.

First, since the leading edge portion 26 is substantially free to radially expand and contract independently of the remainder of the airfoil 24, thermal stresses in the airfoil that would otherwise be created by differential thermal expansion between the leading edge portion 26 and the center portion 27 are eliminated. Second, when combined with a means for inserting the leading edge portion 26 through one of the shrouds, as discussed further below, the provision for radial movement allows the leading edge portion 26 to be replaced—for example, because of corrosion, erosion or cracking—by the simple expedient of radially sliding off the used leading edge portion and radially sliding on a new one, thereby eliminating the need for expensive weld repair.

Figure 4:
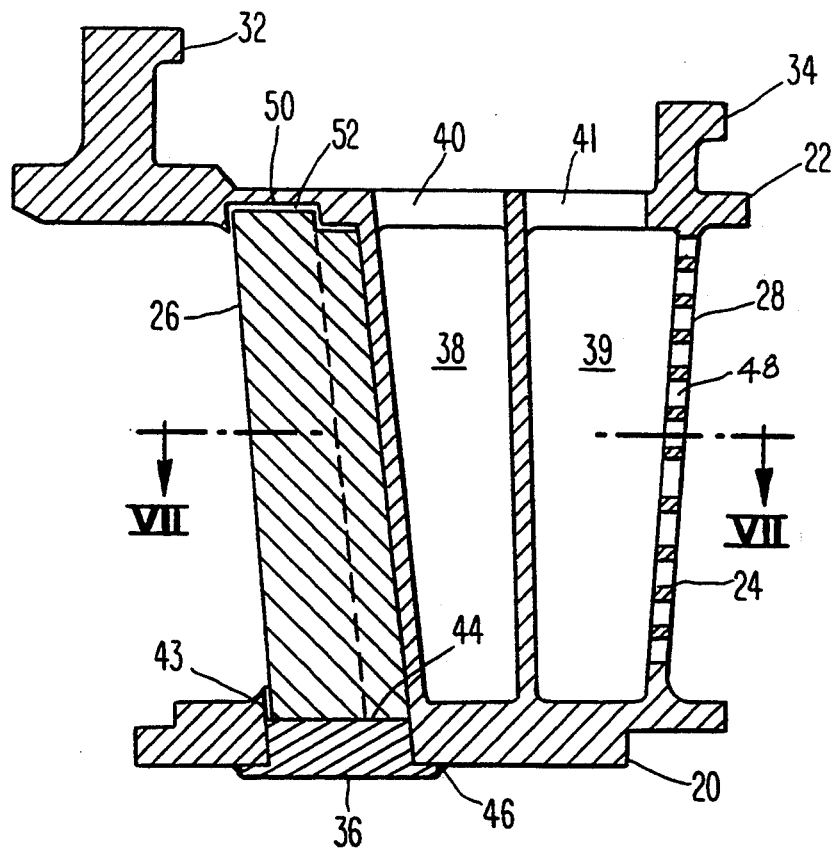
FIG. 4 is a cross-section taken through lines IV—IV shown in FIG. 3.
Figure 3:
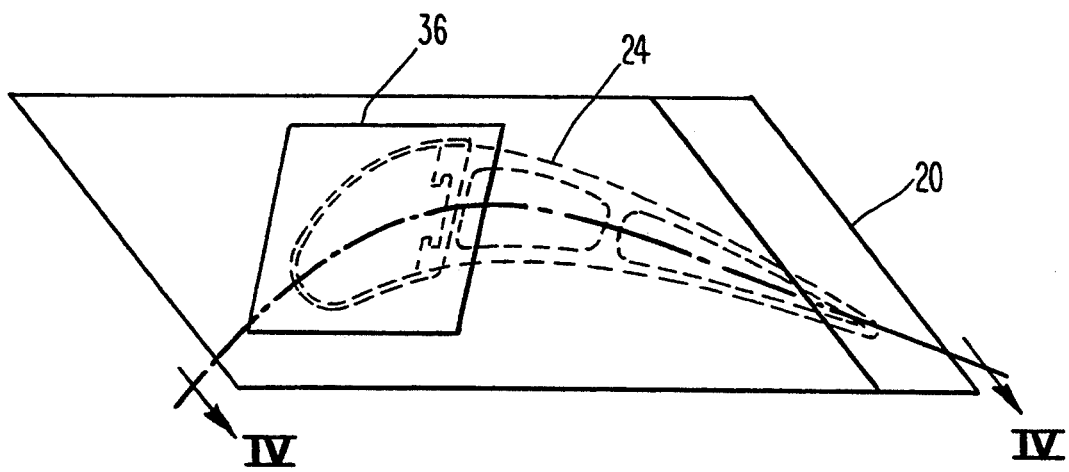
FIG. 3 is a view of the underside of the inner shroud portion of the vane shown in FIG. 2.

As shown in FIG. 4, an opening 43 is formed in the inner shroud 20. The opening 43 has the same shape as the leading edge portion 26 but is slightly larger. In addition, the opening 43 is radially aligned with the leading edge portion 26 so as to allow the leading edge portion to be slid onto the center portion 27 by inserting it through the opening. A closure plate 36, shown in FIGS. 3, 4 and 6, is inserted over the opening 43 after the leading edge portion 26 has been installed and seals the opening. The closure plate 36 is welded to the inner surface of the inner shroud 20 by means of a weld bead 46, as shown in FIG. 4. To replace the leading edge portion 26, the weld bead 46 is ground off and the closure plate 36 removed.

As shown best in FIG. 6, a plug 44, having a cross-sectional shape that matches that of the leading edge portion 26, extends upward from the plate 36 and rests against the bottom of the leading edge portion to correctly locate it along the center portion 27.

As further shown in FIG. 4, a recess 50 is formed in the inner surface of the outer shroud 22. The recess 50, like the opening 43, has the same shape as the leading edge portion 26 but is slightly larger and radially aligned with it. This arrangement allows the top and bottom of the leading edge portion 26 to nest within the outer and inner shrouds 22 and 20, respectively, thereby presenting an aerodynamically desirable, smooth, uninterrupted surface at the ends of the airfoil adjacent the inner and outer shrouds. Depending on the material used for the leading edge portion 26 and the material used for the remainder of the airfoil—and their relative coefficients of thermal expansion—it may be desirable to provide a radial gap 52 between the top of the leading edge portion and the recess 50 in the outer shroud. The gap 52 accommodates differential thermal expansion by allowing the leading edge portion 26 to expand relative to the center portion 27 without creating binding between the inner and outer shrouds 20 and 22.

Since, according to the current invention, the leading edge portion 26 is not integrally formed with the airfoil body, it is possible to form it from a material different from that used to form the airfoil body. As discussed further below, this feature provides an important advantage over integrally formed airfoils, especially when combined with the aforementioned provision for radial expansion of the leading edge portion.

As is traditional, the center and trailing edge portions 27 and 28, respectively, of the airfoil 24 are cooled by diverting cooling air from the combustion section and causing it to flow through these portions of the airfoil. Thus, as shown in FIGS. 4 and 7, the center and trailing edge portions 27 and 28 are substantially hollow as a result of having cooling air passages 38 and 39, respectively, formed within them. Openings 40 and 41 in the outer shroud 22 allow the cooling air 14 from the chamber 7, shown in FIG. 1, to flow into the passages 38 and 39. Radially extending rows of holes 30 and 31, shown in FIG. 2, allow a portion of the cooling air 14 to flow out of the passages 38 and 39, respectively, and over the pressure surface 56 of the airfoil 24. In addition, passages 48 allow a portion of the cooling air 14 to flow downstream through the extreme trailing edge of the airfoil 24.

However, according to the current invention, unlike the center and trailing edge portions, the leading edge portion 26 of the airfoil 24 can be made solid—that is, without cooling air passages—as shown in FIGS. 4 and 7. As a result of eliminating the use of cooling air in the leading edge portion 26, the degradation in thermodynamic performance associated the use of such additional cooling air is avoided. This improvement is possible because, in the preferred embodiment, the leading edge portion 26 is formed from a ceramic material such as silicon nitride, $Si_3N$. Such materials have excellent high temperature strength and corrosion resistance so that the need for cooling air is eliminated. In addition, due to the provision for differential radial expansion between the leading edge portion 26 and the airfoil body afforded by the projection/groove sliding joint, as previously discussed, the inability of brittle ceramic materials to absorb thermal stresses that had heretofore limited their application in gas turbine vanes has been overcome. Alternatively, the leading edge portion 26 can be formed from a composite material formed by a ceramic in a metal matrix. The center and leading edge portions 27 and 28 can be formed from a ceramic material or from one of the cobalt or other metal alloys traditionally used for turbine vanes, such as Hastelloy X.

Although the current invention has been illustrated with reference to the airfoil portion of a turbine vane in a gas turbine, the invention may also be applied to other airfoils utilized in turbo-machines, such as those used in the stationary vanes in the compressor portion of a gas turbine or in a steam turbine, or in the rotating blades of a gas or steam turbine. Consequently, the current invention may be embodied in other specific forms without departing from the spirit or essential attributes thereof and, accordingly, reference should be made to the appended claims, rather than to the foregoing specification, as indicating the scope of the invention.

We claim:

1. A gas turbine, comprising:
a turbine section having a rotating shaft disposed therein to which a row of rotating blades are attached;
a row of stationary vanes circumferentially arranged around said shaft, each of said vanes having an airfoil portion, said airfoil having a leading edge portion, a trailing edge portion, a center portion disposed between said leading edge portion and said trailing edge portion, and means for slidably securing said leading edge portion to said center portion; and wherein said vanes further comprise a shroud attached to said airfoil and a radial gap formed between said leading edge portion and said shroud.

2. The gas turbine according to claim 1, wherein said slidable securing means comprises means for allowing said leading edge portion to slidably move in a radial direction with respect to said center portion.

3. The gas turbine according to claim 1, wherein said slidable securing means comprises first and second interlocking members protruding from said leading edge and center portions, respectively.

4. The gas turbine according to claim 3, wherein one of said interlocking members forms a radially extending groove.

5. The gas turbine according to claim 4, wherein said groove has an approximately T-shaped cross-section.

6. The gas turbine according to claim 1, wherein said slidable securing means comprises a dove tail shaped joint formed between said leading edge portion and said center portion.

7. The gas turbine according to claim 1, wherein said leading edge portion is formed from a ceramic material.

8. The gas turbine according to claim 7, wherein said center portion is formed from a metallic material.

9. The gas turbine according to claim 1, wherein said leading edge portion is formed from a ceramic material disposed in a metal matrix.

10. The gas turbine according to claim 1, wherein said leading edge portion is solid, and wherein said center and trailing edge portions have cooling passages formed therein.

11. A gas turbine, comprising:
a turbine section having a rotating shaft disposed therein to which a row of rotating blades are attached;
a row of stationary vanes circumferentially arranged around said shaft, each of said vanes having an airfoil portion, said airfoil having a leading edge portion, a trailing edge portion, a center portion disposed between said leading edge portion and said trailing edge portion, and means for slidably securing said leading edge portion to said center portion;
wherein said center portion has a cooling passage formed therein and wherein said trailing edge portion and said center portion have holes leading to said cooling passage for allowing cooling air to flow out of said cooling passage and over said airfoil portion, and
wherein said vanes further comprise a shroud attached to said airfoil and a radial gap formed between said leading edge portion and said shroud.

12. The airfoil according to claim 11, wherein said means for detaching said leading edge portion comprises a joint formed between said leading edge portion and said body portion.

13. The airfoil according to claim 11, wherein said joint is formed by inter-locking portions of said leading edge and body portions.

14. The airfoil according to claim 11, wherein said joint has means for allowing motion between said leading edge portion and said body portion in a radial direction while inhibiting motion between said leading edge portion and said body portion in axial and circumferential directions.

15. In a gas turbine, a stationary vane comprising:
a) an airfoil having (i) a body portion, (ii) a leading edge portion attached to said body portion and extending axially upstream therefrom, (iii) means for detaching said leading edge portion from said body portion by moving said leading edge portion in the radial direction, and (iv) first and second ends; and
b) first and second shrouds attached to said first and second ends, respectively, of said airfoil, said leading edge and body portions of said airfoil disposed between said first and second shrouds, said first shroud having an opening formed therein larger than said leading edge portion and radially aligned therewith, whereby said leading edge portion detachable from said body portion by moving said leading edge portion radially through said opening.

16. The vane according to claim 15, further comprising means for limiting radial motion of said leading edge portion through said opening in said first shroud.

17. The vane according to claim 16, wherein said radial motion limiting means comprises a plate attached to said first shroud.

* * * * *